United States Patent
Caselli et al.

(10) Patent No.: US 7,550,166 B2
(45) Date of Patent: Jun. 23, 2009

(54) METHOD FOR PRODUCING FROZEN READY-TO-EAT DISHES BASED ON RICE, BARLEY, WHEAT OR SPELT

(75) Inventors: Oreste Caselli, Bibbiano (IT); Sergio Veronesi, Basilicanova (IT)

(73) Assignee: Barilla G.eR. Fratelli S.p.A. (IT)

( * ) Notice: Subject to any disclaimer, the term of this patent is extended or adjusted under 35 U.S.C. 154(b) by 463 days.

(21) Appl. No.: 10/516,752

(22) PCT Filed: Jun. 5, 2003

(86) PCT No.: PCT/EP03/05904

§ 371 (c)(1),
(2), (4) Date: Sep. 21, 2005

(87) PCT Pub. No.: WO03/103414

PCT Pub. Date: Dec. 18, 2003

(65) Prior Publication Data

US 2006/0115563 A1    Jun. 1, 2006

(30) Foreign Application Priority Data

Jun. 6, 2002    (WO) .................. PCT/IT02/00373

(51) Int. Cl.
A23B 4/06    (2006.01)

(52) U.S. Cl. ...................... 426/393; 426/557

(58) Field of Classification Search .............. 426/393, 426/557

See application file for complete search history.

(56) References Cited

U.S. PATENT DOCUMENTS

| | | | |
|---|---|---|---|
| 4,276,321 A | | 6/1981 | Nagatani |
| 4,623,546 A | * | 11/1986 | Holay et al. ................ 426/448 |
| 4,764,390 A | | 8/1988 | Zuckerman et al. |
| 5,137,745 A | | 8/1992 | Zuckerman et al. |
| 5,987,898 A | | 11/1999 | Olofsson et al. |
| 6,770,312 B1 | * | 8/2004 | Yamamoto et al. .......... 426/302 |

FOREIGN PATENT DOCUMENTS

| | | |
|---|---|---|
| EP | 0 300 948 A1 | 1/1989 |
| EP | 1 108 366 A1 | 6/2001 |
| GB | 2 333 687 A | 8/1999 |

\* cited by examiner

*Primary Examiner*—Timothy M Speer
(74) *Attorney, Agent, or Firm*—Akerman Senterfitt

(57) ABSTRACT

A method for producing a frozen risotto or alike ready-to-eat dish based on rice, barley, wheat or spelt. For risotto the steps include, adding to rice the necessary liquid and particulate ingredients and cooking all the above ingredients up to desired cooking degree, rapidly cooling the thus prepared risotto and feeding it into a dosing apparatus, which forms sphere-like portions of a predetermined weight or volume, which are subjected to ultra-fast freezing and then packaged.

3 Claims, No Drawings

METHOD FOR PRODUCING FROZEN READY-TO-EAT DISHES BASED ON RICE, BARLEY, WHEAT OR SPELT

FIELD OF APPLICATION

The present invention broadly pertains to the frozen food industry.

Specifically, the invention relates to frozen food products based on rice, which are ready for consumption, after being heated, such as risotto, paella and the like.

PRIOR ART

The so-called ready-to-eat dishes have met an ever increasing success among the consumers, since the present way of living leaves very few time available for preparing meals.

The most successful ready-to-eat dishes are the so-called "primi piatti" (first dishes), such as various kinds of pasta with more or less elaborated sauces and the risotto.

The technology which is currently used for producing ready-to-eat dishes includes the steps of preparing the basic ingredients of the dish in a separate manner, freezing them and finally mixing the frozen ingredients in suitable ratios.

Thus, if it is desired to prepare, for example, a dish of pasta with sea food, the operative steps will be the following:

cooling the pasta in water, followed by draining, washing with water and freezing;

preparing and cooking the sauce and converting it into frozen pellets;

cooking and freezing the sea food;

mixing the three ingredients in suitable ratios among them and finally packaging the thus obtained mixture.

The same process as above is carried out when it is desired to prepare a risotto with sea food. Also in this case, rice is separately cooked in water, rinsed and frozen.

Whereas the results achieved with the present technology may be regarded as satisfactory as far as pasta-based dishes are concerned, the same does not apply to rice-based dishes.

In the case of pasta, the employed process involves a separate cooking of pasta and sauce, just as it happens with the traditional way of preparing pasta dishes. In such a case the organoleptic and consistency features of the final dish do not differ so much from those of a corresponding dish, which has been prepared in the traditional way.

On the contrary, in the case of a risotto, the way in which it is prepared is quite different from the traditional way. According to the latter, rice shall not be cooked alone in water, but together with sauce, broth and optional particulate ingredients, such as sea food, mushrooms, asparagus etc.

It is well known that the organoleptic and structural characteristics of a risotto which has been prepared in the traditional way are quite different from those of rice which has simply been boiled and then seasoned with a sauce.

Such a difference is due both to the different amount of water which is absorbed in the two different manners of cooking and to the fact that the starch, which is released from rice upon cooking, is not lost when risotto is prepared according to the traditional recipe. This provides risotto with a velvety consistency and improves its taste.

As a matter of fact, the risotto dishes which are currently available on the market would not even deserve such a name, since the dishes which are eventually obtained, after thawing and heating them, are rather comparable to boiled rice, seasoned with a sauce and other optional ingredients.

Another drawback of the ready-to-eat dishes based on rice which are presently on the market lies in the difficult portioning thereof.

The above ready-to-eat dishes are, in fact, mostly sold as bags or boxes containing about 500 g (the equivalent weight of 2-3 portions) of a mixture consisting of loose rice grains (obtained by freezing, in a fluidized bed, rice which has been boiled in water and rinsed), sauce pellets and various particulate ingredients (mushrooms, mussels, vegetables, etc.).

When the entire package is used, a final dish with the proper weight ratios among the various components can be obtained, but if it desired to just prepare, for instance, a single portion, a part of mixture such as to contain the three ingredients with the correct ratios is very unlikely to be drawn. The final dish will turn out to be either too much or too less seasoned.

The problem underlying the present invention has been that of providing a ready-to-eat dish, based on rice or the like grain cereals, which has organoleptic and structural features as closest as possible to those of traditional risotto and which allows for an easy portioning thereof, thus overcoming the above prior art inconveniences.

SUMMARY OF THE INVENTION

The above problem has been solved, according to the invention, by a method of producing a frozen risotto or a like rice-based ready-to-eat dish, including the steps of:

a) adding to rice the necessary liquid and particulate ingredients for preparing a risotto according to the sequence provided for by the traditional recipe and cooking all the above ingredients up to desired cooking degree;

b) rapidly cooling the thus prepared risotto;

c) feeding the risotto into a dosing apparatus, which forms sphere-like portions of a predetermined weight or volume;

d) subjecting said portion to ultra-fast freezing;

e) packaging a predetermined number of said frozen portions in suitable bags or boxes.

Suitable liquid ingredients to be used in the above-described method are, for instance, the following: meat- or fish- or vegetable-broth, tomato sauce and milk. Exemplary particulate ingredients are the following: vegetables (asparagus, spinach, artichokes, pumpkin, zucchini, etc.), mollusks, crustaceans, fish, meat, mushrooms etc.

In the above-mentioned step of rapid cooling, the risotto is brought from a temperature of above 100° C. to a temperature ranging from 4° to 0° C.

The dosing apparatus for portioning the risotto can, for instance, consist of a screw dosing device.

The method of the present invention can also be carried out for preparing ready-to-eat dishes based on cereal grains other than rice, such as, e.g., wheat, barley and spelt, which are suitable as well for being cooked in the same way as for risotto.

The frozen risotto or like ready-to-eat rice-based dish obtained according to the method of the present invention comes out in the form of a plurality of drop-shaped portions of predetermined volume or weight, each one of these portions including all the ingredients of the risotto or like ready-to-eat rice-based dish in the appropriate ratios.

As a consequence, even when the frozen risotto is packaged in bags typically containing 2-3 portions, it is always possible to prepare a single portion of risotto with the correct ratios between the rice, the sauce and the remaining ingredients, by just using one third to one half of the total number of the frozen drop-like portions.

The method of the present invention will be further described with reference to a non-limiting example, which is provided hereafter for illustration purpose.

EXAMPLE

| Risotto with artichokes | |
|---|---|
| Rice | 1500 g |
| Artichokes | 1000 g |
| Cream | 400 g |
| White wine | 300 g |
| Cheese | 300 g |
| Extra-virgin olive oil | 200 g |
| Sunflower oil | 200 g |
| Onions | 200 g |
| Carrots | 200 g |
| Salt | 155 g |
| Vegetable broth | 100 g |
| Black pepper | 20 g |
| Spinach | 20 g |
| Water | 4000 g |

Onions and carrots were minced and slightly fried in olive oil and sunflower oil for about 5 minutes. Afterwards, rice was added to the above ingredients and let to toast for about 1 minute; then the white wine was added and let to evaporate.

At this point, water and vegetable broth were added, followed by the artichokes, which had previously been sliced, and then by all the remaining ingredients but the cheese.

The above mixture was brought to the boiling temperature and was cooked at such a temperature for about 18 minutes. Afterwards, the mixture was cooled down to about 4° C. by means of a continuous apparatus and grated cheese was added thereto.

The thus obtained risotto was pumped, by such means as not to damage the pieces, like for instance a lobe pump, into the nozzles of a dosing device for forming drop-shaped portions with a diameter of about 30-40 mm, a thickness of 6-8 mm and a weight of 10 g.

The drops were thereafter immediately frozen to −20° C. in 3-5 minutes and packaged in suitable food containers, such as e.g. bags or trays or carton boxes.

The invention claimed is:

1. A method of producing a frozen traditional risotto including the steps of:
   a) adding to rice the necessary liquid and particulate ingredients for preparing a risotto according to the sequence provided for by the traditional recipe and cooking all the above ingredients up to a desired cooking degree, wherein said traditional recipe requires toasting the raw, dry rice with oil and/or butter and onion and then cooking the rice with water and one or more additional ingredients, wherein the one or more additional ingredients are, or yield as a result of said cooking, a sauce, a broth, or a combination thereof;
   b) rapidly cooling the thus prepared risotto to a temperature of 0° to 4° C.;
   c) feeding the risotto into a dosing apparatus, which forms sphere-like portions of a predetermined weight or volume;
   d) subjecting said portion to ultra-fast freezing; and
   e) packaging a predetermined number of said frozen portions in suitable bags or boxes.

2. A method according to claim 1, wherein said liquid ingredients are selected among the group comprising meat- or fish- or vegetable-broth, tomato sauce and milk and said particulate ingredients are selected among the group comprising vegetables, mollusks, crustaceans, fish, meat and mushrooms.

3. A frozen traditional risotto, wherein said frozen risotto is in the form of a plurality of drop-shaped portions of predetermined volume or weight, each one of these portions including all the ingredients of the risotto in the appropriate ratios, wherein said risotto is prepared in accordance with a traditional recipe by:
   toasting the raw, dry rice with oil and/or butter and onion and then cooking said rice with water and one or more additional ingredients, wherein the one or more additional ingredients are, or yield as a result of said cooking, a sauce, a broth, or a combination thereof.

* * * * *